United States Patent Office 2,793,102
Patented May 21, 1957

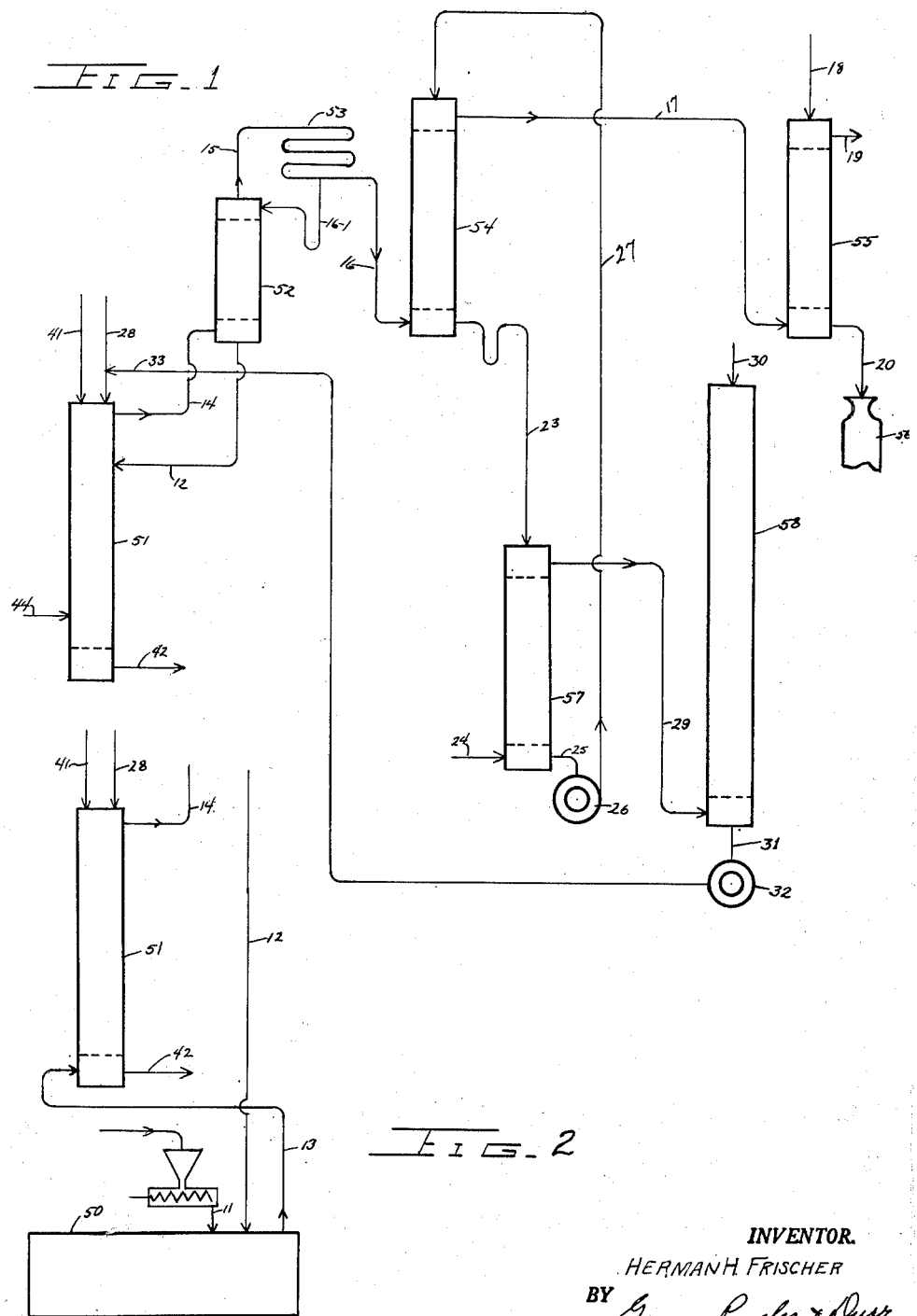

2,793,102
PRODUCTION OF PURE CHLORINE

Herman H. Frischer, New York, N. Y.

Application July 24, 1953, Serial No. 370,049

2 Claims. (Cl. 23—219)

This invention relates to a process for the economical production of pure chlorine from chlorides such as hydrogen chloride, alkali metal chlorides and alkaline earth metal chlorides by treatment of said chlorides with nitric acid.

This application is a continuation in part of U. S. application Serial No. 173,825 filed July 14, 1950, and now abandoned.

It is known that in spite of many efforts, there has not been available a successful process of manufacturing pure chlorine economically from the chlorides by means of nitric acid. Thus none of the technical literature including the patents disclose a process which has any possibility of competing with the electrolytic process for the production of chlorine.

The main difficulties of the known processes are due to the fact that, at the conversion of the hydrogen chloride and/or metal chloride to chlorine by means of nitric acid, it was not possible to obtain all chlorine free of nitrosyl chloride (NOCl) and therefore free of nitrogen oxides. The complete conversion of hydrogen chloride and/or metal chlorides to chlorine, nitrogen peroxide ($NO_2$, $N_2O_4$) and/or the corresponding nitrates require a long reaction time and a surplus of 100 to 200% of nitric acid, thus requiring larger equipment and production costs.

It is known that pure chlorine must not contain any nitrosyl chloride (NOCl) nor nitrogen oxide on account of explosive hazards and losses if used for the chlorination of organic matters, as hydrocarbons and others. Due to the water formed during the reaction and the water contained in the nitric acid consumed, it has been impossible up to the present day to produce all the chlorine contained in the chlorides economically as pure chlorine, free of nitrosyl chloride.

Furthermore, no suitable material resistant to the mixture of chlorine, nitrosyl chloride, nitric acid, nitrogen oxides and water has yet been found for a commercial production of pure chlorine.

Because of these limitations the application of the known processes has been restricted to laboratories and to small experimental apparatus.

Among the objects of this invention is a process which overcomes these previously insurmountable difficulties and makes it possible to convert all chlorine of the chlorides to pure chlorine in a simple economical way on a commercial scale. The present invention greatly reduces the costs of the plant as well as the production costs.

The present-day attempts to produce pure chlorine gas from hydrogen chloride and metal chloride at a high temperature up to boiling point (sodium chloride being given merely as an example) by means of nitric acid, are based on the following equations:

(1) $HCl + HNO_3.aq. + $ excess $HNO_3.aq. =$
   $\frac{1}{2}Cl_2 + NO_2 + H_2O + $ excess $HNO_3.2$ aq.

(2) $NaCl + 2HNO_3.aq. + $ excess $HNO_3.aq. =$
   $NaNO_3 + \frac{1}{2}Cl_2 + NO_2 + H_2O + $ excess $HNO_3.3$ aq.

The amount of the excess of nitric acid is not critical but an excess is required.

The foregoing equations show that during the reaction $H_2O$ is formed and $H_2O$ is also liberated from the consumed nitric acid. This $H_2O$ very considerably dilutes the nitric acid used and greatly prolongs the time required for the conversion of the chlorides into chlorine. In addition, the $H_2O$ reacts with the $NO_2$ obtained to form nitrogen monoxide (NO) which reacts with the chlorine present to form NOCl in accordance with the following equations:

(3) $3NO_2 + xH_2O = 2HNO_3 + NO + (x-1)H_2O$ (4) $NO + \frac{1}{2}Cl_2 = NOCl$

By virtue of these reactions it was not possible to manufacture the entire chlorine free from NOCl and nitrogen oxides without considerable losses of chlorine and without using very complicated and highly expensive procedures, which made the manufacture of pure chlorine uneconomical.

The present invention overcomes the foregoing disadvantages and to this end the invention provides in a process of producing chlorine gas by the oxidation of chlorides with nitric acid, the steps which comprise heating a mixture of a chloride with nitric acid in order to convert the chloride, treating the hereby produced gas-vapor mixture comprising chlorine gas, nitrogen oxides, nitric acid vapors and water vapor with concentrated sulphuric acid of approximately 82 to 100% $H_2SO_4$ content in order to absorb water vapor therefrom to forestall or prevent the formation of nitrosyl chloride, thereafter individually separating concentrated nitric acid vapor, dry chlorine gas and nitrogen peroxide gases ($NO_2$, $N_2O_4$) from the gas-vapor mixture from said treatment with said concentrated sulphuric acid.

In the specification and claims, the term "chloride" is understood to include hydrogen chloride as well as metal chlorides.

One of the main features of this invention is the fact, that in one single and simple step the entire chlorine formed at the conversion of the chlorides with nitric acid is obtained free of any nitrosyl chloride.

Preferably, the treatment of said gaseous mixture with sulphuric acid is carried out under such conditions that the sulphuric acid is diluted by water vapor to an $H_2SO_4$ content of about 68 to 70% and that the temperature of the sulphuric acid is raised to a boiling point of approximately 160 to 170° C., with the result that said sulphuric acid is substantially free from nitrosyl sulphuric acid, nitric acid and chlorine.

A further feature of the present invention is based on the discovery that, if the process represented in the foregoing Equations 1 and 2 may be conducted in such a way that a relatively dilute nitric acid, such as for example of 55 to 65% $HNO_3$ content, is fed into the plant in which the process is being carried out and is treated within the plant in such a way as to provide a highly concentrated nitric acid (for example, 80 to 99% $HNO_3$) for reaction with the chloride, the time for conversion is considerably reduced (to half an hour or less, for example), a higher output in a given apparatus volume is achieved, and a smaller excess of $HNO_3$ is required.

The concentration of the dilute nitric acid may be carried out in the same part of the apparatus and by means of concentrated sulphuric acid of 82 to 100% $H_2SO_4$ content as used for the absorption of the water vapor from the gas-vapor mixture. At the same time the water of the dilute nitric acid is bound to the sulphuric acid and therefore the forming of NOCl is avoided.

The concentrated nitric acid vapor is separated by condensation from dry chlorine gas and dry nitrogen peroxide gas and is used as a replenishing acid for the conversion of further amounts of chlorides to chlorine. The chlorine and nitrogen peroxide gases are separated from each other, the nitrogen peroxide being regenerated to nitric acid by means of oxygen and water.

Moreover, it has been found that after separation of nitrogen peroxide ($NO_2$, $N_2O_4$) the chlorine gas obtained sometimes still contains about 0.2 to 1% of nitryl chloride ($NO_2Cl$). It is known that $NO_2Cl$ decomposes very easily with water, according to the equation:

(5) $\quad 2NO_2Cl + H_2O = 2HNO_3 + Cl_2$

However, according to the invention pure water is not used for this purpose since pure water promotes the formation of hypochloric acid (HClO) and hydrogen chloride (HCl). It has been found that the formation of these undesirable side products can be avoided by using sulphuric acid of approximately 70 to 85% $H_2SO_4$ content for the decomposition of nitryl chloride. Such sulphuric acid is sufficiently diluted to convert the nitryl chloride according to the Equation 5, but it contains sufficient $H_2SO_4$ to keep the chlorine free of humidity and prevent the formation of hypochloric acid and hydrogen chloride.

In order to enable the invention to be more readily understood, reference is made to the accompanying drawings which illustrate diagrammatically and by way of example, two embodiments of plant suitable for carrying the herein-described process into practical effect.

Fig. 1 is a flow diagram of one embodiment of plant; and

Fig. 2 is a flow diagram illustrating another form of plant.

By way of example, the process will hereinafter be described with reference to hydrogen chloride and sodium chloride, although it is understood that other chlorides may be substituted for the sodium chloride, particularly the other alkali metal chlorides and alkaline earth metal chlorides.

The reaction set forth in Equation 1 above, takes place at a boiling temperature in the reactor vessel 51 as shown in the diagram Fig. 1. For each ton of chlorine gas to be produced in 24 hours, for example, from hydrogen chloride, 1.03 ton HCl gas is continuously introduced into the vessel 51 through the conduit 44, about 1.8 ton $HNO_3$ as nitric acid of approximately 60 to 70% $HNO_3$ content are fed through conduit 28, and about 1 ton concentrated nitric acid of approximately 80 to 99% $HNO_3$ content formed from the nitric acid used in excess for the reaction, returns in cycle into the column 51 through line 12. Through conduit 41, approximately 3 to 3½ tons concentrated sulphuric acid of 82 to 100% $H_2SO_4$ content are fed into said column 51. The formed mixture of gases and vapors passing through this column every 24 hours, for example, comprise 1 ton chlorine gas ($Cl_2$), 1.3 ton nitrogen peroxide gas ($NO_2$, $N_2O_4$), said 1 ton nitric acid vapor from the nitric acid used in excess, and about 1.2 ton water vapor coming from the reaction and from the nitric acid used. The said concentrated sulphuric acid vapor binds the water vapor separating it from the gas-vapor mixture. Owing to the binding of the water by said sulphuric acid, a higher temperature is developed, the sulphuric acid is diluted to 68 to 70% $H_2SO_4$ content and heated to and maintained at approximately the boiling point, for example, approximately 160 to 170° C., before leaving the column 51 through line 42. Maintaining the sulfuric acid at approximately the boiling point ensures that the dilute sulphuric acid is free of nitric acid ($HNO_3$), nitrosyl sulphuric acid ($SO_4HNO$) and that concentrated nitric acid vapor, all chlorine and nitrogen peroxide gas, free of any nitrosyl chloride, leave the top of the column. Sulphuric acid of approximately 82 to 100% $H_2SO_4$ content is employed although the concentration will depend on the temperature, the volume of sulphuric acid employed and the amount of water vapor issuing from the nitric acid used and the water formed by the reaction.

The said nitric acid vapor of about 1 ton and gaseous mixture of 1 ton chlorine and 1.3 ton nitrogen peroxide ($NO_2$, $N_2O_4$) leaving the top of the column 51 are continuously passed through line 14 to the heat exchanger 52 and via line 15 to the cooling coil 53, wherein the said 1 ton concentrated nitric acid of 80 to 99% $HNO_3$ content (which has been used in excess), is condensed and separated from the two gases, chlorine and nitrogen peroxide. Cooling coil 53 can be positively cooled by water or brine, if desired. The said concentrated nitric acid from cooling coil 53 has absorbed a small amount of the $NO_2$, $N_2O_4$ gas and flows via line 16—1 into the heat exchanger 52, in counter-current to the said hot chlorine and $NO_2$, $N_2O_4$ gas as well as to the concentrated nitric acid vapor coming from column 51, to be freed from absorbed $NO_2$, $N_2O_4$ so that pure and preheated concentrated nitric acid returns through line 12 into the reaction column 51. Dry chlorine with $NO_2$, $N_2O_4$ gases, free from nitric acid vapors, enter through line 16 into the absorption column 54, where the nitrogen peroxide ($NO_2$, $N_2O_4$) is absorbed by liquid nitric acid introduced at 22, and chlorine free of nitrogen peroxide leaves said absorption column through line 17 passing to column 55, where it is treated with sulphuric acid of 70 to 85% concentration introduced at 18 for the final purification in accordance with Equation 5, above. It will be understood that the absorption columns illustrated in the drawing such as column 54 may be divided into several separate absorption stages.

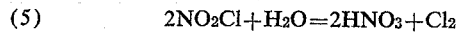

From the absorption column 54 the nitric acid with the absorbed (1.3 ton/24 hr.) nitrogen peroxide is passed through line 23 to the top of the column 57. 0.24 ton oxygen and/or the same amount of oxygen-containing gases, as air, are introduced into the bottom of said column 57 through line 24 to remove the absorbed nitrogen peroxide, and the gas mixture containing oxygen and nitrogen peroxide leaves the column 57 through line 29 to the bottom of the column 58, where said gas-mixture is treated by water to absorb the said 1.3 ton nitrogen peroxide to produce about 1.8 ton nitric acid of about 60 to 70% $HNO_3$ content. The latter leaves the column through line 31 and is recycled by the pump 32 through line 33 into the column 51 or line 28, where it is concentrated to nitric acid of 80 to 99% $HNO_3$ content by the concentrated sulphuric acid of 82 to 100% $H_2SO_4$ content introduced into this column through line 41. The said nitric acid reacts inside the column with the hydrogen chloride introduced through line 44 into said column forming chlorine gas, nitrogen peroxide ($NO_2$, $N_2O_4$) and water vapor. The nitric acid flows from column 57 through line 25 and is recycled by the pump 26 through line 27 into the absorption column 54, to absorb new amounts of nitrogen peroxide. The sulphuric acid is withdrawn from the column 51 through line 42 and may be concentrated and recirculated or used for the production of superphosphate and other chemicals.

If other chlorides, such as alkali metal chlorides and alkaline earth metal chlorides, are employed as the source of chlorine, the process will hereinafter be described in Fig. 2, with reference to sodium chloride by way of example, according to the reaction set forth in Equation 2 above.

For each ton chlorine and the equivalent of 2.4 tons sodium metal nitrate to be produced, 1.7 ton sodium metal chloride is introduced through feeder 11 and approximately 4.8 tons $HNO_3$ as a concentrated nitric acid of 80 to 99% content are introduced through conduit 12 into the vessel 50. The content of this vessel is heated up to the boiling point whereby 2.4 tons sodium metal nitrate are obtained and a gas-vapor mixture consisting of 1 ton chlorine gas, 1.3 ton nitrogen peroxide gas ($NO_2$, $N_2O_4$), 1 ton nitric acid vapor from $HNO_3$ used as excess, and approximately 1.2 ton water vapor are formed. This mixture of vapor and gases is led to column 51 through conduit 13.

To the top of the column 51, about 4 to 5 tons concentrated sulphuric acid of approximately 82 to 100% $H_2SO_4$ content are fed through line 41 and about 1.8 tons $HNO_3$ as diluted nitric acid of approximately 50 to 65% $HNO_3$ content from any nitric acid absorption through line 28, and about 1.8 tons $HNO_3$ as diluted nitric acid from the regenerated $NO_2$, $N_2O_4$ through line 33.

The remainder of the apparatus is the same as that shown in Fig. 1 except that the line 12 from heat exchanger 52 is diverted to the reaction vessel 50, so that concentrated nitric acid used in excess and the concentrated nitric acid from the regeneration of the $NO_2$, $N_2O_4$ continuously circulate between column 51 and vessel 50.

It will be seen that the hereindescribed process utilises to the full extent the heat of the reaction between the water vapor and sulphuric acid, the heat of the oxidation reaction between chloride and the nitric acid, and the excess calorific values of the reaction products which must be cooled. The hereindescribed process also renders it possible to use a nitric acid of low concentration as a raw material and this nitric acid has the dual function of recovering the liberated nitrogen oxides and acting as oxidizing reagent. When the added nitric acid is introduced into the reaction mixture in vessel 50, it is hot acid of a high concentration and at this high concentration it is less corrosive than the more dilute acid would be at the temperatures of the oxidation reaction.

The features and principles underlying the invention described above in connection with specific exemplifications will suggest to those skilled in the art many other modifications thereof. It is accordingly desired that the appended claims shall not be limited to any specific feature or details thereof.

I claim:

1. In a process for the production of pure chlorine by converting in a converter device a chloride selected from the group consisting of hydrogen chloride, alkali metal chlorides and alkali earth metal chlorides by means of nitric acid in excess at an elevated temperature consisting in treating the gas vapor mixture directly as it comes from the converter and comprising chlorine gas, nitrosyl chloride gas, nitrogen oxides ($NO_2$, $N_2O_4$) gases, nitric acid vapor and water vapor with a countercurrent of concentrated sulfuric acid of approximately 82–100% $H_2SO_4$ content in a single stage simultaneously binding all water vapor and decomposing all nitrosyl chloride to dry chlorine gas and dry nitrogen oxides ($NO_2$, $N_2O_4$) thereby obtaining from the gas vapor mixture dry chlorine gas, and dry nitrogen oxides ($NO_2$ and $N_2O_4$) gas and substantially dry nitric acid vapor, the sulfuric acid being heated up to the boiling point and being diluted by the water vapor contained in the gas vapor mixture coming from the converter, withdrawing the sulfuric acid containing the water vapor at a concentration of 68–70% $H_2SO_4$ content from the treatment region free of chlorine, nitrogen oxides, nitric acid and nitrosyl sulfuric acid, said nitrosyl sulfuric acid being temporarily formed within that part of the treatment region containing the concentrated sulfuric acid from said concentrated sulfuric acid and $NO_2$, $N_2O_4$ gases and being totally redecomposed to the compounds $H_2SO_4$ and $NO_2$, $N_2O_4$ as the sulfuric acid is diluted and heated by said water vapor removed from the gas vapor mixture adjacent the area of withdrawal of said sulfuric acid, and thereafter individually separating nitric acid vapor, nitrogen oxide gases and dry chlorine from the resultant dry gas vapor mixture.

2. In a process of producing pure chlorine by converting a chloride selected from the group consisting of hydrogen chloride, alkali metal chlorides and alkali earth metal chlorides by means of nitric acid in excess at an elevated temperature consisting in directly treating the thereby produced gas vapor mixture of chlorine gas, nitrogen oxide gases, nitrosyl chloride, nitric acid vapor and water vapor with a countercurrent stream of concentrated sulfuric acid of approximately 82–100% $H_2SO_4$ content to completely remove water vapor therefrom thereby decomposing all nitrosyl chloride to dry chlorine and dry nitrogen oxides, maintaining said sulfuric acid as it leaves the countercurrent stream at a content of approximately 68 to 70% $H_2SO_4$ and at the boiling temperature, so as to substantially completely free said sulfuric acid from nitrosyl sulfuric acid, nitric acid and chlorine, said nitrosyl sulfuric acid being temporarily formed within that part of the treatment region containing the concentrated sulfuric acid from the concentrated sulfuric acid and $NO_2$, $N_2O_4$ gases and being totally redecomposed to the compounds $H_2SO_4$ and $NO_2$, $N_2O_4$ as the sulfuric acid is diluted and heated by said water vapor removed from the gas vapor mixture adjacent the area of withdrawal of said sulfuric acid, and thereafter individually separating concentrated nitric acid vapor of 80–99% $HNO_3$ content by weight, dry chlorine and nitrogen oxide gases from the dry gas vapor mixture resulting from said treatment with said concentrated sulfuric acid.

References Cited in the file of this patent

UNITED STATES PATENTS

| Number | Name | Date |
|---|---|---|
| 2,092,383 | Tramm et al. | Sept. 7, 1937 |
| 2,150,669 | Beekhuis | Mar. 14, 1939 |
| 2,185,579 | Beekhuis | Jan. 2, 1940 |